US006712482B2

(12) United States Patent
Kawakami et al.

(10) Patent No.: US 6,712,482 B2
(45) Date of Patent: Mar. 30, 2004

(54) ILLUMINATION DEVICE AND LIQUID CRYSTAL APPARATUS USING THE SAME

(75) Inventors: Hisanori Kawakami, Suwa (JP); Masanori Takemura, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/040,930

(22) Filed: Oct. 24, 2001

(65) Prior Publication Data

US 2002/0089840 A1 Jul. 11, 2002

(30) Foreign Application Priority Data

Oct. 25, 2000 (JP) ........................ 2000-326074

(51) Int. Cl.[7] ........................ F21V 8/00; G02F 1/1335
(52) U.S. Cl. ........................ 362/31; 362/561; 349/64; 349/65
(58) Field of Search ........................ 362/26, 27, 31, 362/330, 561; 349/61–65, 67; 385/129; 365/558

(56) References Cited

U.S. PATENT DOCUMENTS

| 4,017,155 A | * | 4/1977 | Yagi et al. ........................ 349/65 |
| 4,105,293 A | * | 8/1978 | Aizenberg et al. ............. 362/31 |
| 4,487,481 A | * | 12/1984 | Suzawa ........................ 349/65 |
| 4,775,222 A | * | 10/1988 | Ohe ........................ 362/26 |
| 4,985,809 A | * | 1/1991 | Matsui et al. ................. 362/31 |
| 5,128,842 A | * | 7/1992 | Kenmochi ........................ 362/31 |
| 5,134,549 A | * | 7/1992 | Yokoyama ........................ 362/31 |
| 5,292,320 A | | 3/1994 | Brown et al. ................. 606/15 |
| 6,052,196 A | * | 4/2000 | Pientka et al. ............. 356/445 |
| 6,273,577 B1 | * | 8/2001 | Goto et al. ................... 362/31 |

FOREIGN PATENT DOCUMENTS

GB 2165631 4/1986

OTHER PUBLICATIONS

European Search Report, 01309009.7–2423.

* cited by examiner

*Primary Examiner*—Alan Cariaso
(74) *Attorney, Agent, or Firm*—Harness, Dickey & Pierce, P.L.C.

(57) ABSTRACT

An illumination device 4 includes a light guide 6 which receives light from a light source 7 at a light-receiving face 6a and emits the light from a light-emitting face 6b. A face 6c opposite the light-receiving face 6a of the light guide 6 is formed as an inclined plane. The light which has reached the inclined plane 6c reflects at an angle off the inclined plane 6c. Therefore, the frequency in diffusion of the light increases. As a result, the luminance of the light emitted from the light-emitting face 6b is improved. The luminance of a planar light can be made uniform by varying the shapes of diffusion patterns 12 disposed on a diffusion sheet 9 according to the distance from the inclined plane 6c.

9 Claims, 8 Drawing Sheets

[FIG. 1]
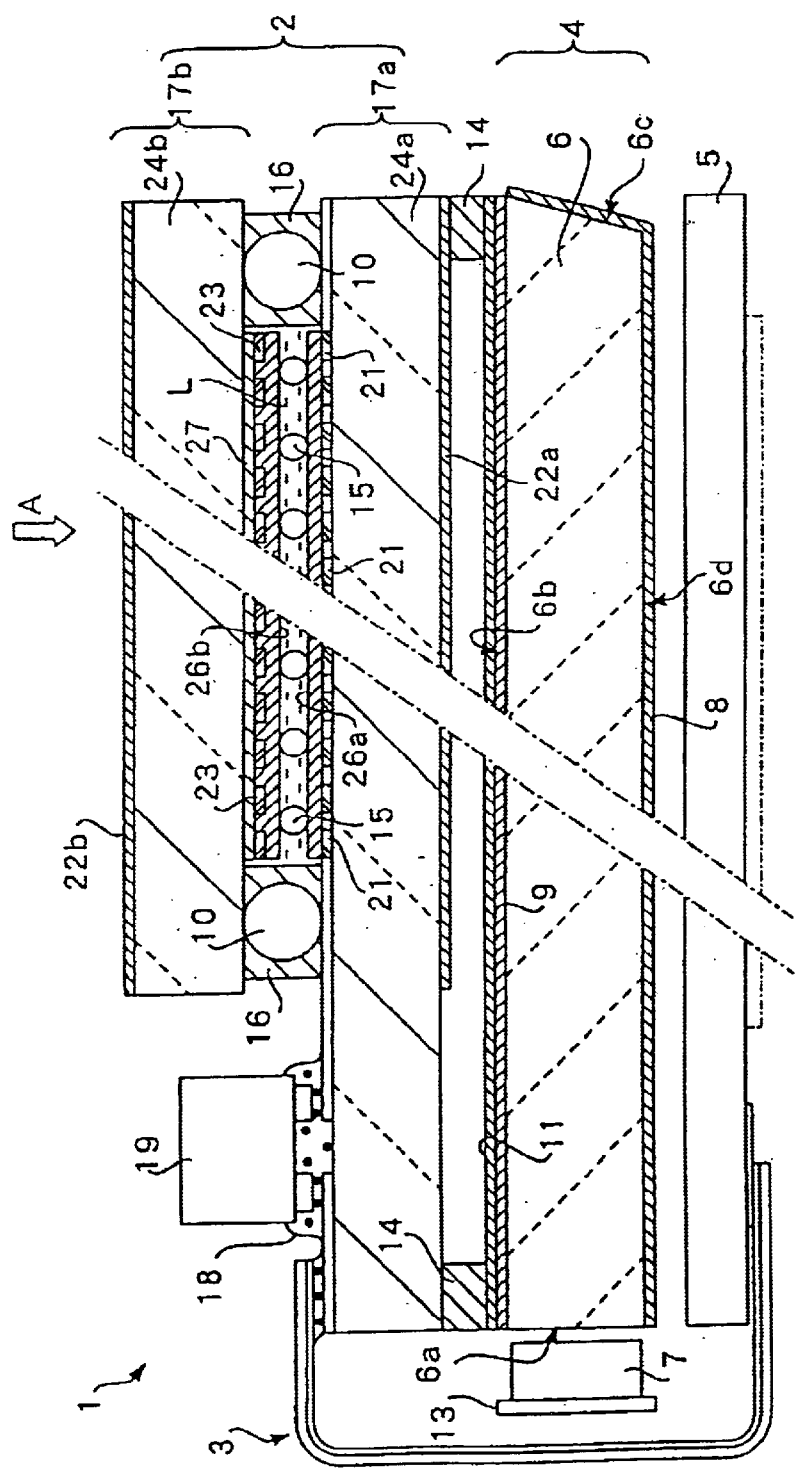

[FIG. 2]
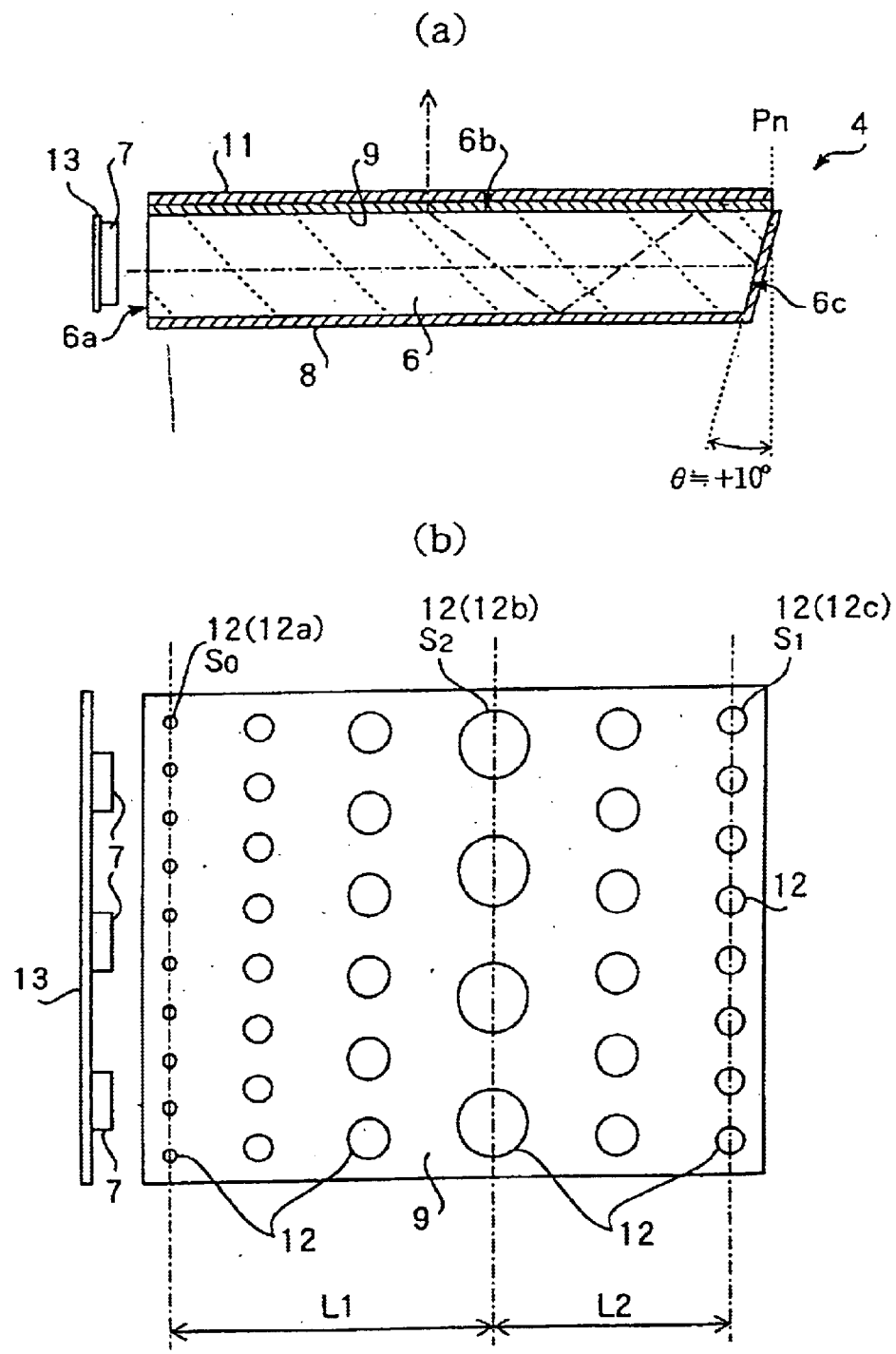

[FIG. 3]
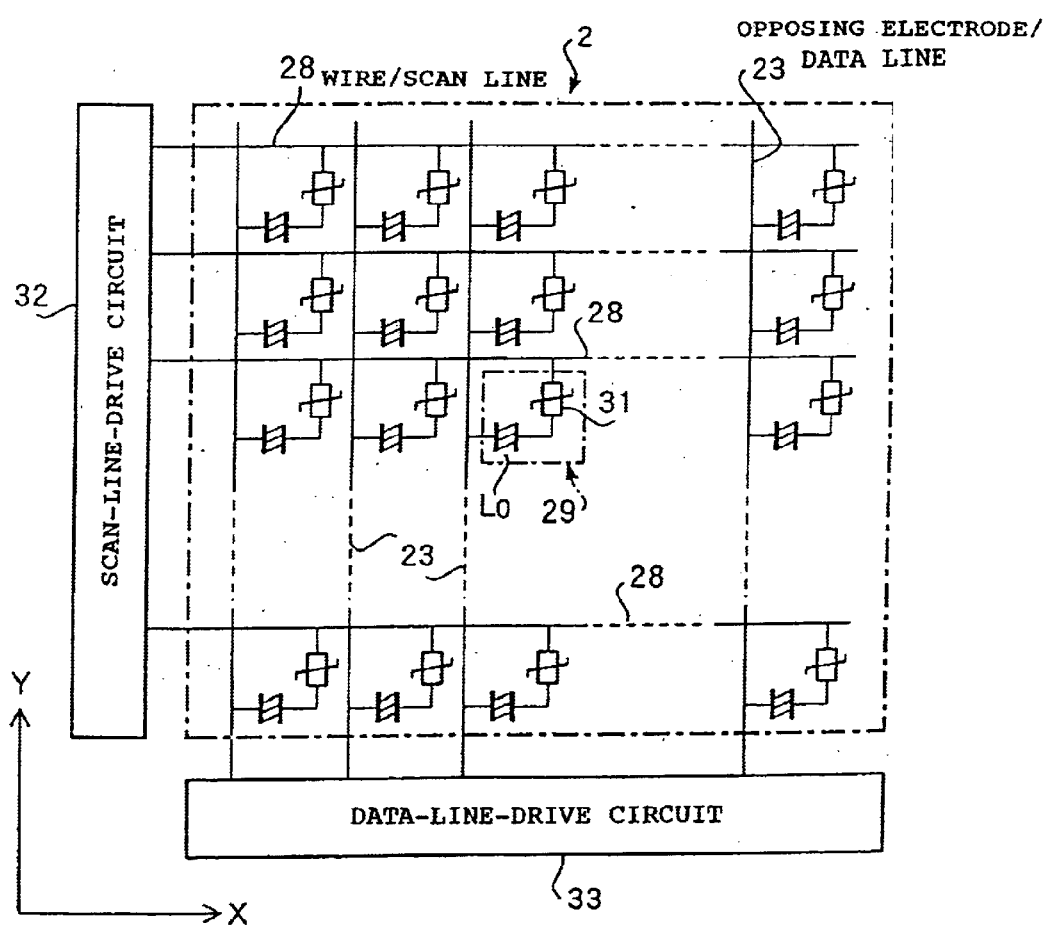

[FIG. 4]
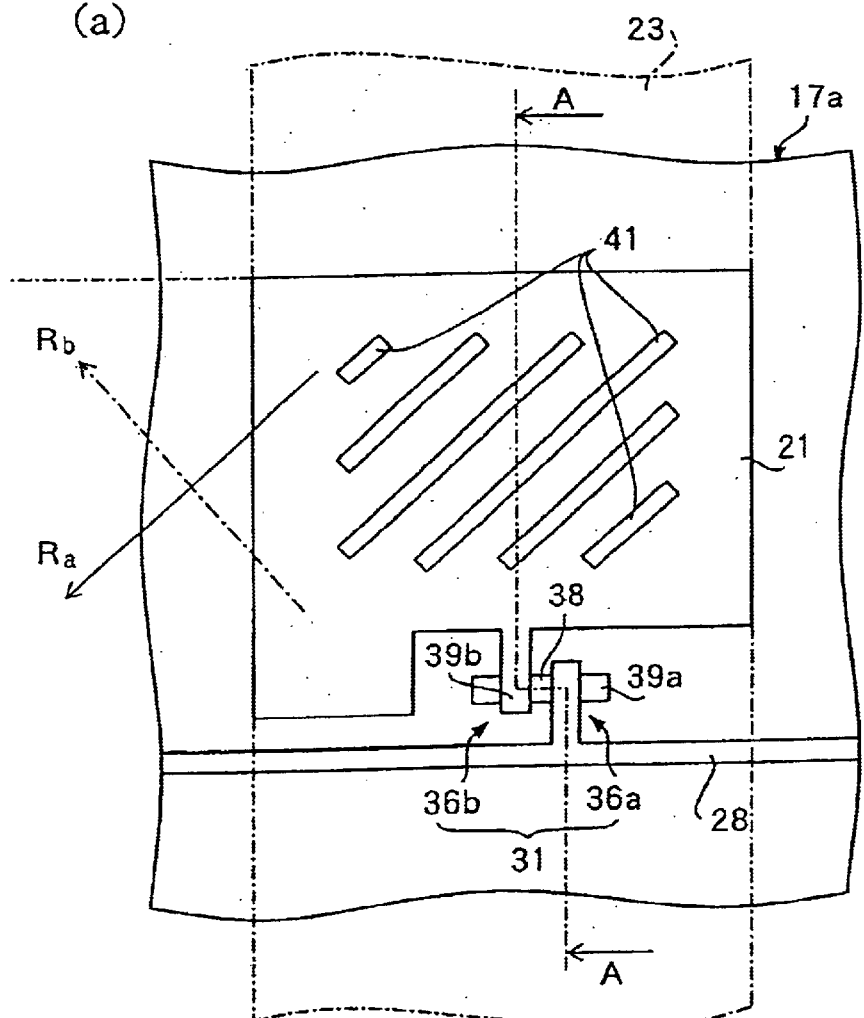
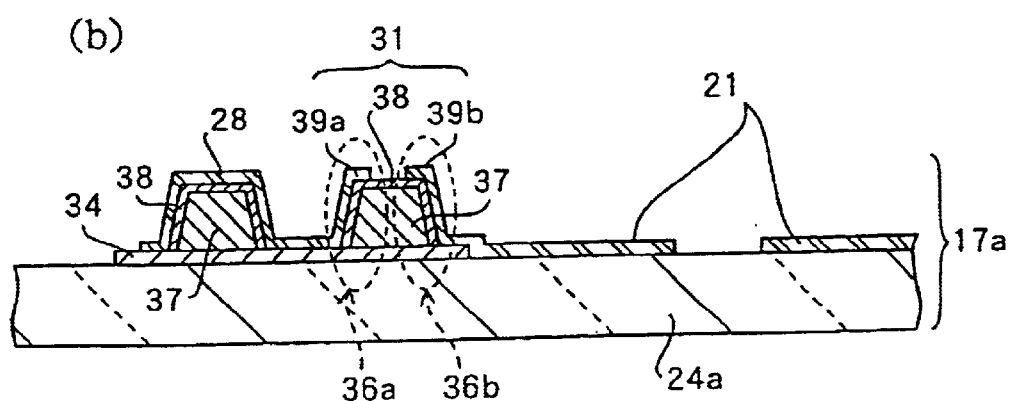

[FIG. 5]
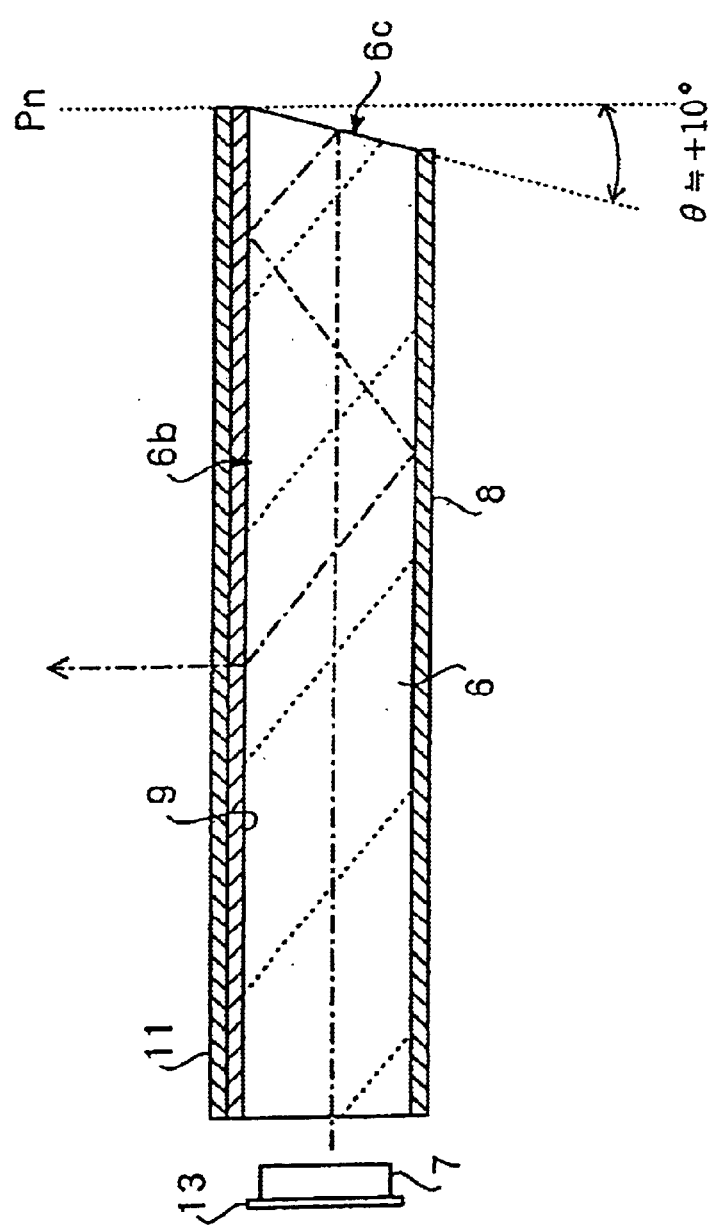

[FIG. 6]
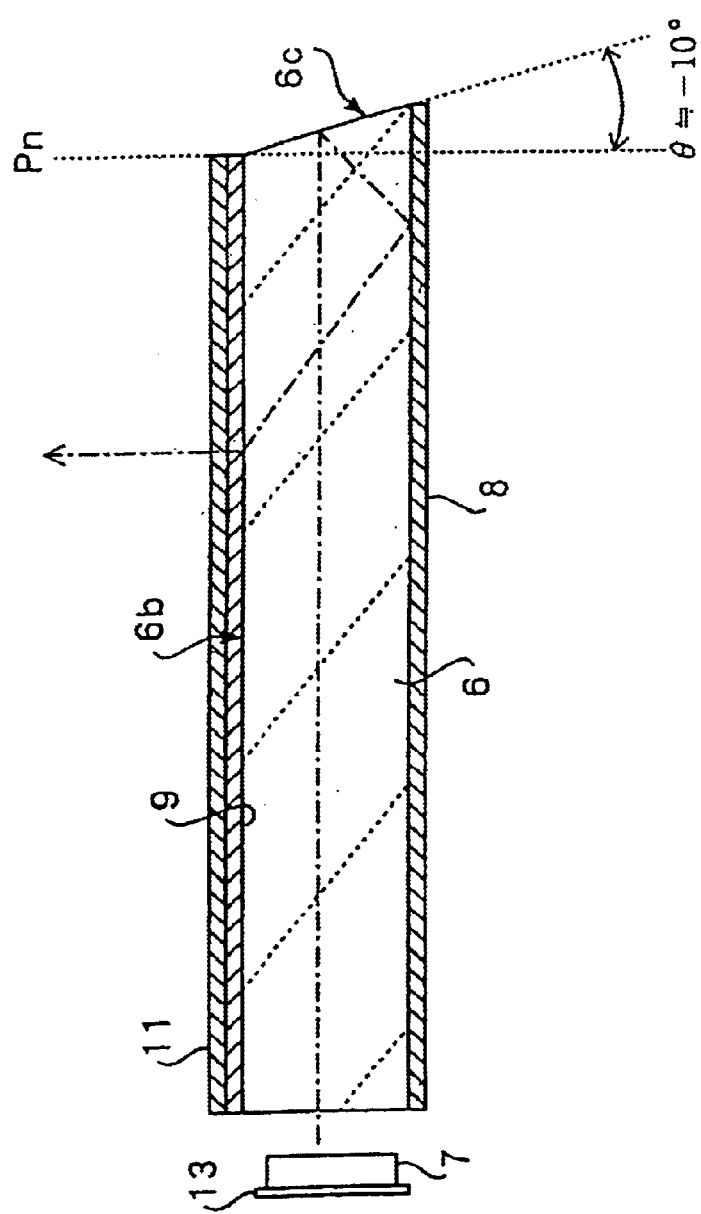

[FIG. 7]
(a)
| ANGLE ($\theta°$) | LIGHT-EMISSION EFFICIENCY (%) |
|---|---|
| −20 | 46 |
| −15 | 48 |
| −10 | 49 |
| −5 | 44 |
| 0 | 40 |
| 5 | 44 |
| 10 | 49 |
| 15 | 48 |
| 20 | 46 |
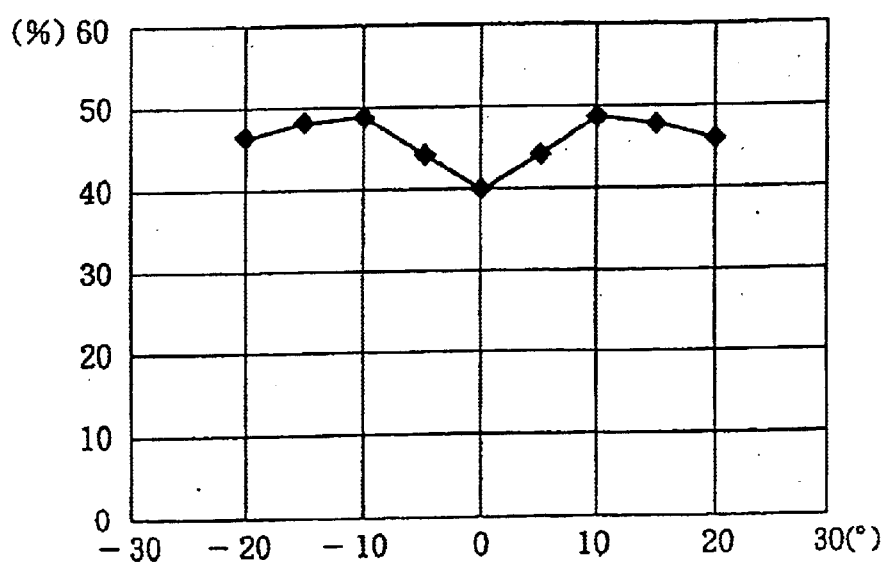
(b)

[FIG. 8]
PRIOR ART
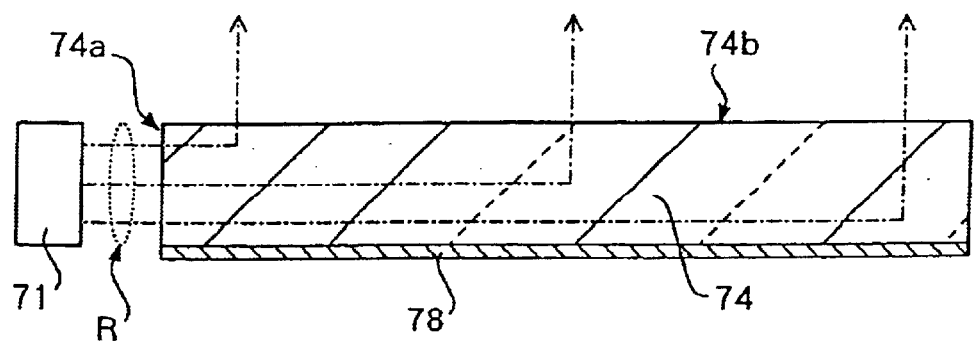

ILLUMINATION DEVICE AND LIQUID CRYSTAL APPARATUS USING THE SAME

BACKGROUND OF THE INVENTION

1. Technical Field of the Invention

The present invention relates to an illumination device including a light guide which receives light emitted by a light source at a light-receiving face of the light guide, guides the light to a light-emitting face of the light guide, and emits the light to the outside. The present invention also relates to a liquid crystal apparatus using the illumination device.

2. Description of the Related Art

Liquid crystal apparatuses are widely known as electro-optical displays. Generally, in the liquid crystal apparatus, liquid crystal is sandwiched between a pair of substrates each provided with electrodes, and the orientation of the liquid crystal is controlled by applying a voltage between the electrodes, thereby modulating light transmitted through the liquid crystal and displaying images.

When classifying the liquid crystal apparatuses according to the method of supplying light to the liquid crystal, various liquid crystal apparatuses are known, such as a reflective-type liquid crystal apparatus in which external light is reflected by a reflector provided on the outer or inner face of one of the pair of substrates, a transmission-type liquid crystal apparatus in which a planar light is applied to the liquid crystal by an illumination device provided on the outer face of one of the pair of substrates, and a semi-transmission reflective liquid crystal apparatus (i.e., transflective) which functions as a reflective-type liquid crystal apparatus when there is sufficient external light and as a transmission-type liquid crystal apparatus when not enough external light is applied.

The illumination device which is used in a transmission-type liquid crystal apparatus or semi-transmission reflective liquid crystal apparatus, as shown in FIG. 8, basically has a light source 71, such as an LED (light emitting diode) or a cold cathode tube, opposing a light-receiving face 74a of a light guide 74, introduces the light received by the light-receiving face 74a from the light source 71 into the light guide 74, guides the light while the light is reflected by a reflector 74b to a light-emitting face 74b, and emits the light to the outside from the light-emitting face 74b. A device, for example, a liquid crystal panel (not shown) which uses a planar light is disposed at the light-emitting face 74b, and the planar light is supplied to the device. Note that a reference symbol R shows conceptual light paths, and it does not show actual light paths.

Recently, color displays using liquid crystal apparatuses have become popular. In order to perform attractive display by using color displays, it is necessary that the light for illuminating the liquid crystal panel has high luminance. In particular, a luminance of app approximately 2 cd/m$^2$ is required for a monochrome display. On the other hand, a high luminance of 10 cd/m$^2$ or more is required for a color display. Moreover, a color display panel has a low light-transmissivity which is, for example, of the order of 2%. Therefore, the illumination device is required to generate high-luminance light.

Although, as described above, the illumination devices have been recently required to generate high-luminance emission light, the light introduced into the light guide 74 is inefficiently emitted to the outside from the light-emitting face 74b in the known basic illumination device shown in FIG. 8. Therefore, there has been a problem that emitted light having high luminance cannot be obtained.

A known illumination device is disclosed in, for example, Japanese Unexamined Patent Application Publication No. 6-082631, in which unevenness in light generation in the vicinity of the edges of the illumination device is avoided with a diffusion member or a light-absorbing member disposed at an end face of a light guide. A known illumination device is also disclosed in, for example, Japanese Unexamined Patent Application Publication No. 8-320486, in which an end face of a light guide, facing a light source, is inclined, thereby increasing the light introduced into the light guide. Another illumination device is disclosed in, for example, Japanese Unexamined Patent Application Publication No. 8-335048, in which a reflective sheet is mounted on a face opposite a light-receiving face of a light guide.

As described above, there are various proposals for avoiding unevenness in light generation and increasing light strength of an illumination device. However, there has been a problem in that it is difficult to generate a planar light having high luminance in the known illumination devices.

Accordingly, an object of the present invention is to provide an illumination device which can form a planar light having high luminance. Another object of the present invention is to provide a liquid crystal apparatus which can perform significantly clear and uniform displays.

SUMMARY OF THE INVENTION

To these ends, a first illumination device according to the present invention comprises a light source; and a light guide for receiving light from the light source at a light-receiving face of the light guide and emitting the light from a light-emitting face of the light guide, wherein a face opposite the light-receiving face of the light guide is formed as an inclined face. That is, the face opposite the light-receiving face of the light guide is angled relative to the light-receiving face.

In the thus formed illumination device, the light, which has been introduced into the light guide from the light-receiving face of the light guide and reaches the inclined face opposite the light-receiving face without being emitted to the outside from the light-emitting face of the light guide, reflects at an angle rather than reflecting directly. As a result, the number of times of reflection of the light, which is being transmitted inside the light guide, increases, thereby increasing frequency in diffusion, whereby the light-emission efficiency improves and the luminance of emitted light increases. Unevenness in the luminance of the emitted light is decreased by increasing the number of times of reflection of the light which is being transmitted inside the light guide.

The angle of inclination of the inclined face of the first illumination device is studied, as follows. The angle of an inclined face 6c is set to a value θ with respect to a plane Pn (plane which extends vertical in the drawing) normal to a light-emitting face 6b of a light guide 6, as shown in FIG. 2(a), and light-emission efficiency was obtained from the following expressions by performing a simulation.

Light-emission efficiency (%)=(emitted-light amount/incident-light amount)×100, in which emitted-light amount=amount of light emitted from light-emitting face 6b, and incident-light amount=amount of light incident to light-receiving face 6a.

The result is shown in FIG. 7(a). The angle θ of inclination, in FIG. 2(a), is shown in a positive value when the inclination is in the clockwise direction and in a negative value when the inclination is in the counterclockwise direction.

A graph shown in FIG. 7(b) was obtained from the data of the result shown in FIG. 7(a). It is known from the graph that the light-emission efficiency is low when the angle θ of inclination of an end face 6c opposing the light-incident side of the light guide 6 shown in FIG. 2(a) is 0°, as in a case of the known illumination device. As the angle of inclination of the end face increases, the light-emission efficiency gradually improves until the angle of inclination becomes approximately ±10°. However, the light-emission efficiency gradually decreases when the angle of inclination exceeds approximately ±10°.

That is, when the face 6c opposite the light-receiving face 6a of the light guide 6 is formed as an inclined plane, high light-emission-efficiency can be obtained when the angle θ of inclination of the inclined face 6c is within a proper range. On the other hand, the light-emission efficiency cannot be significantly improved when the angle θ of inclination is excessively large. The proper range of angle is between approximately +10° and −10°.

Various reasons may be considered, why the light-emission efficiency cannot be improved in the light guide 6 when the angle θ of inclination is excessively large. One reason may be that when the angle θ of inclination is excessively large, the light reflected by the end face is immediately emitted to the outside of the light guide 6 from the vicinity of the end face; therefore, the number of times of reflection of the light in the light guide 6 cannot be increased. Accordingly, in the first illumination device, the angle of inclination of the inclined face 6c is preferably set to approximately ±10° with respect to the plane Pn normal to the light-emitting face 6b of the light guide 6.

In the first illumination device, a reflective member is preferably provided on a face opposite the light-emitting face of the light guide. With this arrangement, the light incident on the light guide can be efficiently emitted to the outside from the light-emitting face. As a reflective member, for example, a white reflective sheet, which is formed independently of the light guide, may be bonded, a white reflective layer, for example, may be formed on a face of the light guide, or any other method may be applied.

In the first illumination device, a reflective member may be provided also on the inclined face opposite the light-incident face of the light guide. With this arrangement, the light incident on the light guide is prevented from leaking to the outside through the opposite inclined face, thereby further improving the emission efficiency. As a reflective member, for example, a white reflective sheet, which is formed independently of the light guide, may be bonded, a white reflective layer, for example, may be formed on a face of the light guide, or any other method may be applied.

(2) A second illumination device according to the present invention comprises: a light source; a light guide for receiving light from the light source at a light-receiving face of the light guide and emitting the light from a light-emitting face of the light guide; and diffusion patterns provided on a light-emitting face or a face opposite the light-emitting face of the light guide, wherein the face opposite the light-receiving face of the light guide is formed as an inclined face, and the pattern density of the diffusion patterns increases from the inclined face toward a middle part of the light guide. Thus, the face opposite the light-receiving face of the light guide is angled relative to the light-receiving face.

The pattern density is a ratio of an area, which is occupied by the diffusion patterns, per a unit area of the light guide. For example, in order to increase the pattern density, the size of the diffusion patterns may be increased, or density in pattern disposition may be increased without changing the size of patterns.

The second illumination device differs from the first illumination device in that the diffusion patterns are provided on the light-emitting face or the face opposite the light-emitting face, and the shape of the diffusion patterns is determined in connection with the inclined plane, in addition to forming the face opposite the light-receiving face of the light guide as an inclined face.

When a face opposite the light-receiving face, that is, the face opposite the light-incident face is formed as an inclined face, the light which reaches the inclined face reflects at an angle off the inclined plane. Therefore, the luminance of the light emitted to the outside from the light-emitting face of the light guide tends to increase toward the inclined plane, that is, the end face opposite the incident side of the light guide, whereby the uniformity of a planar light may be deteriorated. When the pattern density of the diffusion patterns is set so as to increase from the inclined plane, that is, the end face of the light guide toward a middle part of the light guide, as in the second illumination device, the luminance of the emitted light at the end face side of the light guide can be decreased, and the luminance of the emitted light at the middle part of the light guide can be increased, whereby the luminance of the emitted planar light can be made uniform.

With reference to FIG. 2(b) which is a schematic plan view of the illumination device, when the pattern density of diffusion patterns 12a disposed in the vicinity of a light source 7 is denoted by S0, the pattern density of diffusion patterns 12c disposed in the vicinity of the inclined face 6c opposite the incident side is denoted by S1, and the pattern density of diffusion patterns 12b disposed in a middle part of the light guide 6 is denoted by S2, the relationship between these pattern densities preferably satisfies an expression S0<S2<S2.

When the pattern density of the diffusion patterns is set, as described above, the light-emission efficiency in the vicinity of the LED 7 is lowest, the light-emission efficiency in the vicinity of the inclined end-face 6c which is considered as a dummy light-source is second lowest, and the light-emission efficiency at the middle part is maintained highest. As a result, the luminance of the emitted planar light from the light guide 6 is made uniform.

In the illumination device in which the diffusion patterns are formed on the light-emitting face or a face opposite the light-emitting face of the light guide in relation to the inclined end face, as described above, an expression L1>L2 is preferably satisfied when L1 denotes a distance from the diffusion patterns 12a of which the pattern density is S0 and which are disposed closest to the LED 9 to the diffusion patterns 12b of which the pattern density is S2 and which are disposed in the middle part, and L2 denotes a distance from the diffusion patterns 12c of which density is S1 and which are disposed closest to the inclined end-face 6c to the diffusion pattern 12b of which the pattern density is S2 and which are disposed in the middle part, as shown in FIG. 2(b).

With this arrangement, the luminance at the end toward the light source side, which tends to be a highest luminance, is lowered, the luminance at the dummy light-source side, that is, the end toward the inclined face 6c side, which tends to be a second highest luminance, is moderately lowered, and the luminance at the middle part, which tends to be a lowest luminance, can be controlled so that the attenuation becomes as smallest as possible, whereby the luminance of the planar light from the light guide 6 can be made uniform.

The light source in each of the first and second illumination devices is preferably an LED (light emitting diode). Generally, a cold cathode-ray tube such as a fluorescent light or other light source such as an LED may be used. The LED among these light sources has a high directivity; therefore, a large portion of the component of the light generated by the LED and received by the light guide at the light-receiving face reaches the opposite end face without being emitted to the outside of the light guide, when the LED is used as a light source.

In this case, when any particular arrangement is not performed on the face opposite the light-receiving face, as in the known illumination device, the components of the light, which have reached the face opposite the light-receiving face, are reflected directly toward the light-receiving face and is not easily emitted to the outside of the light guide. Therefore, it is difficult to obtain a light having a high luminance emitted from the light guide.

When the face opposite the light-receiving face 6a is inclined, as in the present embodiment, the light which has reached the inclined plane can reflect at an angle, thereby reflecting multiple times inside the light guide, whereby emitted light having a high luminance can be obtained particularly from the LED which has high directivity.

(3) A first liquid crystal apparatus according to the present invention comprises: a liquid crystal panel comprising a pair of substrates sandwiching liquid crystal; and an illumination device for supplying light to the liquid crystal panel. The illumination device comprises a light source and a light guide which receives light from the light source at a light-receiving face of the light guide and emits the light from a light-emitting face of the light guide. A face opposite the light-receiving face of the light guide is formed as an inclined plane. That is, the face opposite the light-receiving face of the light guide is angled relative to the light-receiving face.

In an illumination device which is included in the liquid crystal apparatus according to the present invention, the light, which has been introduced into the light guide from the light-receiving face of the light guide and reached an inclined plane opposite the light-receiving face without being emitted to the outside from a light-emitting face of the light guide, reflects at an angle rather than reflecting directly. As a result, the number of times of reflection of the light which is being transmitted inside the light guide increases, thereby increasing frequency in diffusion, whereby the light-emission efficiency is improved and the luminance of emitted light is increased. Unevenness in the luminance of the emitted light is decreased by increasing the number of times of reflection of the light which is being transmitted inside the light guide. Since the luminance of the light from the illumination device can be increased and unevenness in the luminance can be decreased, clear images can be displayed uniformly in the overall region of a display.

(4) A second liquid crystal apparatus according to the present invention comprises: a liquid crystal panel comprising a pair of substrates sandwiching liquid crystal; and an illumination device for supplying light to the liquid crystal panel. The illumination device comprises a light source, a light guide which receives light from the light source at a light-receiving face of the light guide and emits the light from a light-emitting face of the light guide, and diffusion patterns provided on a light-emitting face or a face opposite the light-emitting face of the light guide. A face opposite the light-receiving face of the light guide is formed as an inclined plane, and the pattern density of the diffusion patterns increases from the inclined plane toward a middle part of the light guide. Thus, the face opposite the light-receiving face of the light guide is angled relative to the light-receiving face.

The second liquid crystal apparatus differs from the first liquid crystal apparatus in that the illumination device included in the second liquid crystal apparatus is modified. In particular, the diffusion patterns are provided on the light-emitting face or a face opposite the light-emitting face, and the shape of the diffusion patterns is determined in relation to the inclined plane, in addition to forming the face opposite the light-receiving face of the light guide as an inclined plane.

When the face opposite the light-receiving face, that is, the face opposite the light-incident face is formed as an inclined plane, the light which reaches the inclined face reflects at an angle off the inclined plane. Therefore, the luminance of the light emitted to the outside from the light-emitting face of the light guide tends to increase toward the inclined plane, that is, the end face opposite the incident side of the light guide, and therefore the evenness of a planar light may be deteriorated. When the pattern density of the diffusion patterns is set so as to increase from the inclined plane, that is, the end face of the light guide toward a middle part of the light guide, as in the illumination device used in the second liquid crystal apparatus, the luminance of the emitted light at the end face side of the light guide can be decreased, and the luminance of the emitted light at the middle part of the light guide can be increased, whereby the luminance of the emitted planar light can be made uniform. Therefore, clear images can be displayed uniformly in the overall region of a display of the liquid crystal apparatus.

BRIEF DESCRIPTION OF THE DRAWINGS

FIG. 1 is a sectional view of structures in lateral section of an illumination device and a liquid crystal apparatus according to an embodiment of the present invention.

FIG. 2 includes illustrations of diffusion patterns used in the illumination device shown in FIG. 1.

FIG. 3 is a schematic diagram of the electrical configuration of a liquid crystal panel forming the liquid crystal apparatus shown in FIG. 1.

FIG. 4 includes a plan view (a) and a sectional view (b) along line A—A shown in FIG. 4(a) of the configuration of a pixel of the liquid crystal panel shown in FIG. 3.

FIG. 5 is a lateral sectional view of an illumination device according to another embodiment of the present invention.

FIG. 6 is a lateral sectional view of an illumination device according to still another embodiment of the present invention.

FIG. 7 includes data (a) and a graph (b) which show a result of simulation performed on an illumination device.

FIG. 8 is a lateral sectional view of a known illumination device.

DETAILED DESCRIPTION OF THE PREFERRED EMBODIMENTS

When classifying liquid crystal apparatuses according to the type of drive of liquid crystal, there are an active-matrix-type liquid crystal apparatus in which pixel electrodes are driven by switching elements (that is, non-linear elements) and a passive-matrix-type liquid crystal apparatus which is formed with an array in a simple matrix and in which the switching elements are not used.

In the active-matrix-type liquid crystal apparatuses, there are known a type in which three-terminal-type elements such as thin-film transistors (TFTs) are used and another type in which two-terminal-type elements such as thin-film diodes (TFDs) are used. The liquid crystal apparatus using the TFDs or the like has advantages such that problems of short-circuit between wires do not theoretically occur because there are no intersections between the wires, and film-forming processes and photolithography processes can be made shorter.

The active-matrix-type liquid crystal apparatus using the TFDs as switching elements according to an embodiment of the present invention is described below. The liquid crystal apparatus according to the present embodiment is a transreflective liquid crystal apparatus which functions as a reflective type when exterior light is sufficiently available and as a transmission type when the exterior light is not enough.

FIG. 1 is a lateral section of a liquid crystal apparatus 1. The liquid crystal apparatus includes an illumination device 4 disposed at the non-display side (the lower side in FIG. 1) of a liquid crystal panel 2, and a control board 5 at the side of a nonlight-generation face (the lower side in FIG. 1) of the illumination apparatus 4. The liquid crystal panel 2 and the control board 5 are electrically connected to each other via an FPC (flexible printed circuit) 3. Reference numeral 14 denotes cushion members disposed between the liquid crystal panel 2 and the illumination device 4.

The illumination device 4 includes a light guide 6 and an LED 7 as a light source. The LED 7 is mounted on an LED substrate 13 and faces a light-receiving face 6a of the light guide 6. The LED substrate 13 is mounted to, for example, a substrate holder made of a resin simultaneously when the light guide 6 is formed, and is supported by the light guide 6.

The light guide 6 is made of, for example, an acrylic resin, a polycarbonate resin, glass, or the like, and is provided with a reflective sheet 8 as a reflective member mounted by bonding or the like to the light guide 6 at the side of a nonlight-generation face, that is, at a face of the light guide 6 opposite the liquid crystal panel 2. A diffusion sheet 9 and a prism sheet 11 are mounted by bonding or the like to the light guide 6 at a light-emitting face 6b thereof.

A face opposite the light-receiving face 6a of the light guide 6 is inclined by an angle θ with respect to a plane Pn normal to the light-emitting face 6b so as to form an inclined plane 6c, as shown in FIG. 2(a). The reflective sheet 8 extends to a position covering the inclined plane 6c.

The reflective sheet 8 serves to reflect the light emitted by the LED 7 and received through the light-receiving face 6a of the light guide 6, and is made of, for example, white polyethylene terephthalate foam or the like. The diffusion sheet 9 is provided with a number of diffusion patterns 12 at the side of a light-generation face (the side opposite the liquid crystal panel 2 shown in FIG. 1), as shown in FIG. 2(b).

The light that is being transmitted inside the light guide 6 is guided to the outside of the light guide 6 by varying the refraction of the light by the diffusion patterns 12. The diffusion patterns 12 are made, for example, by printing white paint on a sheet. The diffusion patterns 12 having convex or concave shapes may be formed simultaneously when the light guide 6 is made of a resin, that is, integrally with the light guide 6. The prism sheet 11 is an optical element provided with a convex or concave prism pattern on a sheet, and serves to apply the light from the diffusion sheet 9 toward a central part.

In FIG. 1, the liquid crystal panel 2 includes a pair of substrates 17a and 17b bonded to each other via a sealing material 16 which has an annular shape when viewed in a direction A. Liquid crystal L is sealed in a gap, that is, a so-called cell gap defined by the first substrate 17a, the second substrate 17b, and the sealing material 16. Spherical or cylindrical gap materials 10 are spread in the sealing material 16, and a number of spacers 15 are disposed in the cell gap and are spread on an inner face of at least one of the substrates 17a and 17b, the gap materials 10 and the spacers 15 functioning to maintain the cell gap in a given size.

A substrate-extension part provided on the first substrate 17a and extending from the second substrate 17b is mounted with a liquid-crystal-driving IC 19 at a surface of the substrate-extension part via an ACF (anisotropic conductive film) 18. The second substrate 17b is also provided with a substrate-extension part extending from the first substrate 17a, the substrate-extension part being mounted with a liquid-crystal-driving IC, although not shown.

The liquid crystal apparatus according to the present embodiment is an active-matrix-type liquid crystal apparatus which uses TFDs as switching elements. One of the first and second substrates 17a and 17b serves as an element substrate and the other serves as an opposing substrate. According to the present embodiment, the first substrate 17a serves as an element substrate and the second substrate 17b serves as an opposing substrate.

The first substrate 17a as an element substrate is provided with pixel electrodes 21 formed in a dot matrix, viewed in the direction A, on an inner surface of a base material 24a which is made of glass, a plastic, or the like, an alignment film 26a formed on the pixel electrodes 21, and a polarizing plate 22a mounted, for example, by bonding to the base material 24a on an outer surface thereof. Although the base material 24a which is disposed on a side other than the display side is not necessarily transparent when it is used in a simple reflective-type, the base material 24a must be transparent when it is used in an apparatus to be used as a reflective type and a transmission-type as well, as in the present embodiment.

The second substrate 17b as an opposing substrate is provided with a color filter 27 on an inner surface of a base material 24b made of glass, a plastic, or the like, opposing electrodes 23 formed in stripes viewed in the direction A on the color filter 27, an alignment film 26b formed on the opposing electrodes 23, and a polarizing plate 22b mounted, for example, bonding to the base material 24b on an outer surface thereof.

The alignment films 26a and 26b are formed, for example, by applying a polyimide solution and firing. It is said that main polymer chains of polyimide of the polyimide solution are run in a predetermined direction by rubbing, whereby liquid crystal polymers in the liquid crystal L sealed in the cell gap are oriented in the extending direction of the alignment films.

Concerning the color filter 27, elements of primary colors R (red), G (green), and B (blue) are formed in a predetermined array in positions of the opposing substrate, which face the pixel electrodes 21 formed on the first substrate 17a. A black matrix of BK (black) is formed corresponding to a position which does not face the pixel electrodes 21.

FIG. 3 is a schematic diagram of an electrical configuration of the liquid crystal panel 2. In the drawing, the liquid crystal panel 2 includes a plurality of wires 28 formed in the row direction (x-direction), a plurality of the opposing electrodes 23 formed in the column direction (y-direction), and pixels 29 each formed at the intersection between the wire 28 and the opposing electrode 23. Each pixel 29 is formed with a liquid crystal layer L0 and a TFD (thin-film diode) 31 connected to each other in series. The pixel electrode 21 shown in FIG. 1 is connected to the wire 28 via the TFD 31 shown in FIG. 3, and sandwiches the liquid crystal L in cooperation with the opposing electrode 23, thereby forming the liquid crystal layer L0. In FIG. 1, the first substrate 17a and the second substrate 17b are bonded to each other in such a manner that the pixel electrodes 21 disposed in a column face one opposing electrode 23.

In FIG. 3, each wire 28 is driven by a scan-line-drive circuit 32 and thereby serves as a scan line. Each opposing electrode 23 is driven by a data-line-drive circuit 33 and thereby serves as a data line. The scan-line-drive circuit 32 and the data-line-drive circuit 33 are included as components for forming a circuit in each of the liquid-crystal-driving IC 19 shown in FIG. 19 and the other liquid-crystal-driving IC which is not shown.

The opposing electrode 23 is formed with a transparent conductive material such as ITO (indium-tin oxide). The pixel electrode 21 is formed with a reflective material such as Al (aluminum). The pixel electrode 21 is made of a reflective material because a reflective display is performed by using each pixel electrode 21 as a reflective element.

Although in FIG. 3, the TFD 31 is connected to the wire 28 side, that is, to the scan line side, and the liquid crystal layer L0 is connected to the opposing electrode 23 side, that is, to the data line side, the TFD 31 may be connected to the data line side and the liquid crystal layer L0 may be connected to the scan line side in an inverse manner.

As shown in FIGS. 4(a) and 4(b), the TFD 31 includes two TFDs which are a first TFD 36a and a second TFD 36b formed on an insulative film 34 deposited on a surface of the first substrate 17a. The insulative film 34 is formed of, for example, tantalum oxide $Ta_2O_5$ to have a thickness of 50 to 200 nm.

The oxide film 34 is provided so that, firstly, a first metallic film 37 will not be separated from a base material due to heat treatment after deposition of second metallic films 39a and 39b, and secondly, impurities will not be diffused into the first metallic film 37. Therefore, when these risks are not foreseen, the insulative film 34 may be omitted.

The TFDs 36a and 36b is formed with the first metallic film 37, an oxide film 38 formed on a surface of the first metallic film 37 and functioning as an insulative member, and the second metallic films 39a and 39b formed on a surface of the oxide film 38, the second metallic films 39a and 39b being separated from each other. The oxide film 38 is made of, for example, tantalum oxide $Ta_2O_5$ having a thickness of 10 to 35 nm which was formed by oxidizing the surface of the first metallic film 37, for example, by anodic oxidation by using a solution of 0.01 to 0.1 weight percent citric acid as a chemical conversion solution. When the first metallic film 37 is anodic-oxidized, the surface of a base for the wires 28 is oxidized at the same time, thereby forming an oxide film made of tantalum oxide in the same fashion.

The second metallic films 39a and 39b are made of a reflective material, for example, Al by using a film-deposition technology such as sputtering, are patterned by photolithography and etching, and are finally formed to have a thickness of 50 to 300 nm. The second metallic film 39a is used as the wire 28 and the second metallic film 39b is connected to the pixel electrode 21.

The first TFD 36a has a lamination structure including the second metallic film 39a/the oxide film 38/the first metallic film 37 in that order when viewed from the wire 28 side, that is, a sandwich structure of a metal/insulator/metal, of which the current-voltage characteristic in the positive and negative directions is nonlinear. The second TFD 36b includes the first metallic film 37/the oxide film 38/the second metallic film 39b in that order when viewed from the wire 28 side, which has a current-voltage characteristic opposite to that of the first TFD 36a. As a result, the TFD 31 includes two elements connected in series in an opposite direction, whereby the nonlinear current-voltage characteristics are symmetrical in the respective positive and negative directions unlike a case in which a single element is provided.

The first metallic film 37 is made of tantalum, a tantalum alloy, or the like. The thickness of the first metallic film 37 is set to an appropriate value according to the use of the TFD 31, which is generally 100 to 500 nm.

The TFD 31 is a two-terminal-type nonlinear element. An element such as an MSI (metal semi-insulator) which uses a diode-element structure, a device which includes these elements connected to each other in an inverse direction in series or in parallel, or the like may be used. When it is not necessary to make the current-voltage characteristics strictly symmetrical in the respective positive and negative directions, the TFD may be formed with a single element.

The pixel electrode 21 is provided with obliquely formed slit-like openings 41, as shown in FIG. 4(a). When the liquid crystal apparatus functions as a reflective type, the pixel electrode 21 itself serves as a reflective factor, and when the liquid crystal apparatus functions as a transmission-type, the light passing through the openings 41 is introduced to the liquid crystal layer L0. When the pixel electrode 21 functions as a reflective factor, the light reflected thereby is preferably scattered, and thus a surface of the pixel electrode 21 is preferably provided with fine undulations thereon.

When the alignment film 26a (see FIG. 1) of the first substrate 17a is rubbed in a direction Ra which is to the left obliquely downward by 45°, and rubbing of the alignment film 26b (see FIG. 1) of the second substrate 17b, which faces the alignment film 26a, is performed in a direction Rb which is to the left obliquely upward by 45°, the openings 41 extend in the same direction as the rubbing direction Ra.

Although in the above description, the second metallic films 39a and 39b and the pixel electrodes 21 are made of the same material, the second metallic films 39a and 39b may be formed by patterning a non-reflective metal such as chrome, then, by patterning a reflective metal, such as Al, as the pixel electrodes 21.

In the thus formed liquid crystal apparatus 1 shown in FIG. 1, when the environment is bright, external light around the liquid crystal apparatus 1 is introduced into the liquid crystal panel 2 through the polarizing plate 22b, and is reflected by the pixel electrodes 21 after passing through the liquid crystal L. The reflected light again passes through the liquid crystal L and the polarizing plate 22b, and is emitted to the outside. When the light passes, as described above, through the liquid crystal L, the liquid crystal L of each pixel is voltage controlled according to scan signals and data signals, whereby the light passing through the liquid crystal L is modulated for each pixel, thereby displaying characters and other images by the light which selectively passes through the polarizing plate 22b. Thus, a reflective-type display is performed.

When it is dark around the liquid crystal apparatus 1, the LED 7 generates light, the generated light is received through the light-receiving face 6a of the light guide 6 into the light guide 6. The received light is reflected by the reflective sheet 8 at a non-light-generating face 6d, then, by the inclined plane 6c opposite the light-receiving face 6a. In this particular embodiment of the present invention, the reflected light is emitted to the outside through the light-emitting face 6b while the reflection is stimulated by the reflective sheet 8 at the inclined plane 6c, is spread by the diffusion sheet 9, is condensed to a central part by the prism sheet 11, and is supplied to the liquid crystal panel 2. The supplied light is processed in the same manner as in the above-described reflective-type display, thereby displaying characters and other images on the liquid crystal panel 2. Thus, a transmission-type display is performed.

In the liquid crystal apparatus 1 according to the present embodiment, the end face of the light guide 6 opposite the light-receiving face 6a thereof is formed as the inclined plane 6c. An angle θ of the inclined face 6c is set to θ≅+10° with respect to the plane Pn normal to the light-emitting face 6b of the light guide 6, as shown in FIG. 2(a). With this arrangement, the efficiency of light-emission from the light-emitting face 6b of the light guide 6, that is, the luminance is improved compared with a case in which the angle is set to θ=0°.

According to the present embodiment in FIG. 2, the diffusion patterns 12 are formed on the diffusion sheet 9 in such a manner that the pattern density of the diffusion patterns 12 increases from the inclined face 6c opposite the light-receiving face 6a of the light guide 6 toward a middle part of the light guide 6. Particularly, the diameter of each diffusion pattern 12b disposed in a middle part (not necessarily the central point) of the light guide 6 is larger than the diameter of each diffusion pattern 12c disposed at the inclined plane 6c side. As a method of increasing the pattern density, the density of diffusion patterns having the same size may be increased rather than increasing the size of the diffusion patterns.

When the face 6c opposite the light-receiving face 6a of the light guide 6 is inclined, the light which reaches the inclined plane 6c is reflected by the inclined plane 6c at an angle. Therefore, the luminance of the light emitted to the outside through the light-emitting face 6b of the light guide 6 may be increased toward the inclined plane 6c, that is, toward an end opposite the light-incident side of the light guide 6, whereby the evenness of a planar light may be deteriorated. On the other hand, when the pattern density of the diffusion patterns 12 is set to increase from the inclined plane 6c opposite the light-incident side toward a middle part of the light guide 6, the luminance at the end face 6c side of the light guide decreases, and the luminance of emitted light at the middle part of the light guide increases, whereby the emitted light can have a planarly even luminance.

According to the present embodiment, when S0 denotes a pattern density of diffusion patterns 12a in the vicinity of the LED 7, S1 denotes a pattern density of the diffusion patterns 12c in the vicinity of the inclined plane 6c which is disposed opposite the light-incident side of the light guide 6, and S2 denotes a pattern density of the diffusion patterns 12b at a middle part of the light guide 6, the relationship of the pattern occupancies is expressed by an expression S0<S1<S2. In particular, the above-expressed relationship between the pattern occupancies is realized by changing the outer diameter of each diffusion pattern 12a, 12b, or 12c.

It must be noticed that the diffusion patterns 12a, 12b, and 12c are schematically shown in FIG. 2 to be larger than the actual patterns and in a number smaller than that of the actual patterns for clear description of the relationship of size between the diffusion patterns 12a, 12b, and 12c.

When the relationship of pattern density between the diffusion patterns 12a, 12b, and 12c is set as described above, the light-emission efficiency of the light guide 6 in the vicinity of the LED 7 is lowest, the light-emission efficiency in the vicinity of the inclined end-face 6c opposing the light-incident side which is considered as a dummy light-source is second lowest, and the light-emission efficiency at a middle part of the light guide 6 is maintained highest. As a result, the luminance of the emitted light from the light guide 6 is made planarly uniform.

According to the present embodiment, when L1 denotes a distance from the diffusion patterns 12a of which the pattern density is S0 and which are disposed closest to the LED 9 to the diffusion patterns 12b of which the pattern density is S2 and which are disposed in the middle part, and L2 denotes a distance from the diffusion patterns 12c of which density is S1 and which are disposed closest to the inclined end-face 6c to the diffusion pattern 12b of which the pattern density is S2 and which are disposed in the middle part, an expression L1>L2 is satisfied.

With this arrangement, the luminance at an end toward the LED 7 side, which tends to be a highest luminance, is lowered, the luminance at the dummy light-source side, that is, the end toward the inclined plane 6c side, which tends to be a second highest luminance, is moderately lowered, and the luminance at the middle part, which tends to be a lowest luminance, can be controlled so that the attenuation becomes as smallest as possible, whereby the luminance of the light from the light guide 6 can be made planarly uniform.

A cold cathode-ray tube such as a fluorescent light or other light source may be used as a light source for the illumination device 4 other than the LED 7. The LED 7 among these light sources has a high directivity, and thus a large portion of constituent of the light generated by the LED 7 and received by the light guide 6 at the light-receiving face 6a reaches the end face 6c opposite the light-incident side without being emitted to the outside of the light guide 6, when the LED 7 is used as a light source.

In this case, when any particular arrangement is not made regarding the angle of a face opposite the light-receiving face 6a, as in the known illumination device, components of the light, which has reached the face opposite the light-receiving face, are reflected directly toward the light-receiving face, and are not easily emitted to the outside of the light guide. Therefore, it is difficult to obtain emission light having a high luminance from the light guide.

When the face 6c opposite the light-receiving face 6a is inclined, as in the present embodiment, the light which has reached the inclined face 6c can reflect at an angle, thereby reflecting multiple times inside the light guide 6, whereby emitted light having a high luminance can be obtained particularly from the LED 7 which has high directivity.

FIG. 5 shows another embodiment of the illumination device according to the present invention. In this embodiment, components which are the same as those used in the embodiment shown in FIG. 2(a) are referred to by using the same reference numerals, for which description is omitted. The present embodiment shown in FIG. 5 differs from the embodiment shown in FIG. 2(a) in that the reflective sheet 8 is not provided on the inclined face 6c opposite the light-incident side of the light guide 6. Even when a reflective member is not provided on the inclined face 6c, the light which has reached the inclined face 6c is reflected at an angle by the inclined plane 6c, whereby the number of reflections of the light inside the light guide 6 increases, thereby improving the efficiency of light emission from the light-emission face 6b.

FIG. 6 shows still another embodiment of the illumination device according to the present invention. In this embodiment, components which are the same as those used in the embodiment shown in FIG. 2(a) are referred to by using the same reference numerals, for which description is omitted. The present embodiment shown in FIG. 6 differs from the above embodiment shown in FIG. 5 in that although in the embodiment shown in FIG. 5, the inclined plane 6c is inclined toward the + side, that is, in the clockwise direction with respect to the plane Pn normal to the light-emission face 6b, the inclined plane 6c is inclined toward the − side, that is, in the counterclockwise direction preferably by an angle θ≈−10°. When the inclined plane 6c is inclined in the positive or negative direction, as described above, the efficiency of light emission from the light-emitting face 6b can be improved.

The present invention is not limited to the preferred embodiments described above, and the embodiments may vary in various ways within a scope of the invention set forth in the claims.

For example, although in the embodiment shown in FIG. 1 the illumination device according to the present invention is used in an active-matrix-type liquid crystal apparatus, the illumination device according to the present invention may be used in other type of liquid crystal apparatus, for example, in a simple-matrix-type liquid crystal apparatus. Although a transreflective-type liquid crystal apparatus is shown in FIG. 1, the illumination device according to the present invention may be used in a reflective or transmission-type liquid crystal apparatus.

In FIG. 1, the diffusion sheet 9 may be provided not only on the light-emitting face 6b of the light guide 6, but also be provided on an opposite face, that is, the non-light-generating face 6d. The diffusion patterns 12 shown in FIG. 2(b) are not necessarily provided by bonding the same to the light guide 6. They may be formed integrally with the light guide 6 when the light guide 6 is formed.

In the illumination device and the liquid crystal apparatus according to the present invention, the light, which has been introduced into the light guide from a light-receiving face of the light guide and reached an inclined plane opposite the light-receiving face without being emitted to the outside from a light-emitting face of the light guide, reflects at an angle rather than reflecting directly. As a result, the number of times of reflection of the light which is being transmitted inside the light guide increases, thereby increasing frequency in diffusion, whereby the light-emission efficiency improves and the luminance of emitted light increases. Unevenness in the luminance of the emitted light is decreased by increasing the number of times of reflection of the light which is being transmitted inside the light guide.

The entire disclosure of Japanese Patent Application No. 2000-326074 filed Oct. 25, 2000 is incorporated by reference.

What is claimed is:

1. An illumination device comprising:
   a light source; and
   a light guide for receiving light from the light source at a light-receiving face thereof and emitting the light from a light-emitting face of the light guide,
   wherein a face opposite the light-receiving face of the light guide is formed as an inclined plane so that a face opposite the light-emitting face projects beyond the light-emitting face at a side of the inclined plane; and
   wherein an angle of inclination of the inclined plane is approximately ten degrees in a positive or negative direction with respect to a plane normal to the light-emitting face of the guide.

2. An illumination device according to claim 1, wherein a reflective member is provided on the face opposite the light-emitting face of the light guide.

3. An illumination device comprising:
   a light source; and
   a light guide for receiving light from the light source at a light-receiving face thereof and emitting the light from a light-emitting face of the light guide; and
   wherein a face opposite the light-receiving face of the light guide is formed as an inclined plane so that a face opposite the light-emitting face projects beyond the light-emitting face at a side of the inclined plane; and
   wherein a reflective member is provided on the inclined plane of the light side.

4. An illumination device of claim 1, comprising:
   diffusion patterns provided on at least one of the light-emitting face and a face opposite the light-emitting face of the light guide,
   wherein the pattern density of the diffusion patterns increases from the inclined plane toward a middle part of the light guide.

5. An illumination device according to claim 4, wherein an expression S0<S1<S2 is satisfied, in which S0 denotes the pattern density of the diffusion patterns disposed in the vicinity of the light source, S1 denotes the pattern density of the diffusion patterns disposed in the vicinity of the inclined plane, and S2 denotes the pattern density of the diffusion patterns disposed in the middle part of the light guide.

6. An illumination device according to claim 5, wherein an expression L1>L2 is satisfied, in which L1 denotes a distance from the diffusion patterns having the pattern density S0 and disposed closest to the light source to the diffusion patterns having the pattern density S2 and disposed in the middle part, and L2 denotes a distance from the diffusion patterns having the pattern density S1 and disposed closest to the inclined plane to the diffusion patterns having the pattern density S2 and disposed in the middle part.

7. An illumination device according to claim 4, wherein the light source is an LED (light emitting diode).

8. A liquid crystal apparatus comprising:
   a liquid crystal panel including:
      a pair of substrates sandwiching liquid crystals; and
      a liquid crystal driving IC mounted on a substate-extension part where one of the pair of substrates extends beyond the other substate; and
   an illumination device disposed at a non-display side of the crystal panel and supplying light to the liquid crystal panel, the illumination device including:
      a light source; and
      a light guide which receives light from the light source at a light-receiving face thereof and emits the light from a light-emitting face of the light guide;
   wherein the light source is disposed at a side where the liquid crystal driving IC is mounted on the substate-extension part and facing the light-receiving face; and
   a face opposite the light-receiving face of the light guide is formed as an inclined plane.

9. A liquid crystal device according to claim 8, wherein a face opposite the light-emitting face extends beyond the light-emitting face at a side of the inclined plane.

* * * * *